United States Patent
Gao (10) Patent No.: US 12,315,419 B2
(45) Date of Patent: May 27, 2025

(54) SQUARE WAVE CHAMFERING CIRCUIT AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Xuanquan Gao, Guangdong (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/759,853

(22) PCT Filed: Jun. 29, 2022

(86) PCT No.: PCT/CN2022/102381
§ 371 (c)(1),
(2) Date: Jul. 29, 2022

(87) PCT Pub. No.: WO2023/231120
PCT Pub. Date: Dec. 7, 2023

(65) Prior Publication Data
US 2024/0185759 A1 Jun. 6, 2024

(30) Foreign Application Priority Data

May 30, 2022 (CN) .......................... 202210604039.9

(51) Int. Cl.
*G09G 3/3266* (2016.01)
*G09G 3/20* (2006.01)

(52) U.S. Cl.
CPC ...... *G09G 3/2092* (2013.01); *G09G 2300/0842* (2013.01); *G09G 2310/0267* (2013.01); *G09G 2310/0294* (2013.01); *G09G 2310/08* (2013.01)

(58) Field of Classification Search
None
See application file for complete search history.

(56) References Cited

U.S. PATENT DOCUMENTS

2015/0221249 A1 8/2015 Kim et al.
2016/0365057 A1* 12/2016 Zeng .................... G09G 3/3677

FOREIGN PATENT DOCUMENTS

| CN | 104821155 A | 8/2015 |
|---|---|---|
| CN | 105070243 A | 11/2015 |

(Continued)

OTHER PUBLICATIONS

International Search Report in International application No. PCT/CN2022/102381, mailed on Dec. 15, 2022.

(Continued)

*Primary Examiner* — Amr A Awad
*Assistant Examiner* — Donna V Bocar
(74) *Attorney, Agent, or Firm* — PV IP PC; Wei Te Chung (57) ABSTRACT

Embodiments of the present disclosure are directed to a square wave chamfering circuit and a display panel. A control circuit controls the output node to output a chamfering signal based on a current through a path between the control circuit and the second power supply end. By using the control circuit to control an output node to output a chamfering signal based on a current through the control circuit and the second power supply end, a slow decline (Continued)

slope of the voltage output by the output node solves the problem of the large voltage drop of the display panel driving voltage.

18 Claims, 5 Drawing Sheets

(56) References Cited

FOREIGN PATENT DOCUMENTS

| | | |
|---|---|---|
| CN | 105513552 A | 4/2016 |
| CN | 106251803 A | 12/2016 |
| KR | 20080013158 A | 2/2008 |

OTHER PUBLICATIONS

Written Opinion of the International Search Authority in International application No. PCT/CN2022/102381, mailed on Dec. 15, 2022.

Chinese Office Action issued in corresponding Chinese Patent Application No. 202210604039.9 dated Mar. 11, 2023, pp. 1-6.

\* cited by examiner

SQUARE WAVE CHAMFERING CIRCUIT AND DISPLAY PANEL

FIELD OF THE INVENTION

The present disclosure relates to the field of display technology, more particularly, to a square wave chamfering circuit and a display panel.

BACKGROUND

With the development of display technology, the display panel adopts a gate driving circuit to complete the function of progressive scanning, which reduces the production cost of the display panel and meets the requirements of the narrow frame of the display panel. In response to a transition of a gate scanning signal from a high voltage level to a low voltage level, the square wave driving signal output by the gate driving circuit will also drop sharply from a high voltage level to a low voltage level, and the driving voltage of the display panel will also drop sharply from a high voltage level to a low voltage level as well. This sharp voltage drop of the display panel driving voltage induces the display panel to flicker and to display an residual image, thereby affecting the quality of the display panel seriously.

SUMMARY

Technical Problem

An embodiment of the present disclosure provides a square wave chamfering circuit and a display panel to solve the problem of the large voltage drop of the display panel driving voltage.

Technical Solution

According to an embodiment of the present disclosure, a square wave chamfering circuit includes a first power supply end, a second power supply end, a driving circuit, and a control circuit. The driving circuit is coupled to the first power supply end, a first node, an output node, a first control signal input end, and a second control signal input end. The driving circuit conducts signal of the first power supply end to the output node in response to a signal of the first control signal input end, and conducts the output node and the first node in response to a signal of the second control signal input end. The control circuit is coupled to the first node and the second power supply end. The control circuit controls the output node to output a chamfering signal based on a current through a path between the control circuit and the second power supply end.

Optionally, the driving circuit comprises a first transistor and a second transistor. The first transistor includes a gate coupled to the first control signal input end, a drain coupled to the first power supply end, and a source coupled to the output node. The second transistor includes a gate coupled to the second control signal input end, a drain coupled to the output node, and a source coupled to the first node.

Optionally, the control circuit comprises a switching circuit coupled between the first node and a second node, a current sampling circuit coupled between the second node and the second power supply end, and a voltage comparing circuit coupled to the switching circuit and the second node. The voltage comparing circuit controls a turned-on state of the switching circuit based on a comparing result between a voltage of the second node and a set threshold voltage, to control the output node to output the chamfering signal.

Optionally, the current sampling circuit comprises a first resistor coupled between the second node and the second power supply end.

Optionally, the switching circuit comprises a first bipolar junction transistor, comprising a base coupled to the voltage comparing circuit, an emitter coupled to the first node, and a collector coupled to the second node.

Optionally, the voltage comparing circuit comprises a second bipolar junction transistor and a second resistor. The second bipolar junction transistor includes a base coupled to the second node, an emitter coupled to a third node, and a collector coupled to a first low voltage level signal input end. The second resistor is coupled to the third node and the first high voltage level signal input end.

Optionally, the switching circuit comprises a field effect transistor, comprising a gate coupled to the voltage comparing circuit, a drain coupled to the first node, and a source coupled to the second node.

Optionally, the voltage comparing circuit comprises a voltage comparator that comprises a positive power supply end coupled to a second high voltage level signal input end, a negative power supply end coupled to a second low voltage level signal input end, a positive phase input end coupled to a third low voltage level signal input end, a negative phase input end coupled to the second node, and an output end coupled to the gate of the field effect transistor. An electric potential of the third low voltage level signal input end is higher than an electric potential of the second power supply end.

Optionally, the first transistor is an N-type transistor or a P-type transistor, the second transistor is an N-type transistor or a P-type transistor, and the first power supply end and the second power supply end are the same control signal input end.

Optionally, the driving circuit further comprises a storage capacitor, coupled between the output end and ground.

According to another embodiment of the present disclosure, a display panel includes a square wave chamfering circuit and a gate driving circuit, comprising a plurality of shift registers cascaded. A driving signal output end of each of the shift registers is coupled to one of gate lines. The square wave chamfering circuit includes a first power supply end, a second power supply end, a driving circuit, and a control circuit. The driving circuit is coupled to the first power supply end, a first node, an output node, a first control signal input end, and a second control signal input end. The driving circuit conducts signal of the first power supply end to the output node in response to a signal of the first control signal input end, and conducts the output node and the first node in response to a signal of the second control signal input end. The control circuit is coupled to the first node and the second power supply end. The control circuit controls the output node to output a chamfering signal based on a current through a path between the control circuit and the second power supply end.

Optionally, the driving circuit comprises a first transistor and a second transistor. The first transistor includes a gate coupled to the first control signal input end, a drain coupled to the first power supply end, and a source coupled to the output node. The second transistor includes a gate coupled to the second control signal input end, a drain coupled to the output node, and a source coupled to the first node.

Optionally, the control circuit comprises a switching circuit coupled between the first node and a second node, a current sampling circuit coupled between the second node and the second power supply end, and a voltage comparing circuit coupled to the switching circuit and the second node. The voltage comparing circuit controls a turned-on state of the switching circuit based on a comparing result between a voltage of the second node and a set threshold voltage, to control the output node to output the chamfering signal.

Optionally, the current sampling circuit comprises a first resistor coupled between the second node and the second power supply end.

Optionally, the switching circuit comprises a first bipolar junction transistor, comprising a base coupled to the voltage comparing circuit, an emitter coupled to the first node, and a collector coupled to the second node.

Optionally, the voltage comparing circuit comprises a second bipolar junction transistor and a second resistor. The second bipolar junction transistor includes a base coupled to the second node, an emitter coupled to a third node, and a collector coupled to a first low voltage level signal input end. The second resistor is coupled to the third node and the first high voltage level signal input end.

Optionally, the switching circuit comprises a field effect transistor, comprising a gate coupled to the voltage comparing circuit, a drain coupled to the first node, and a source coupled to the second node.

Optionally, the voltage comparing circuit comprises a voltage comparator that comprises a positive power supply end coupled to a second high voltage level signal input end, a negative power supply end coupled to a second low voltage level signal input end, a positive phase input end coupled to a third low voltage level signal input end, a negative phase input end coupled to the second node, and an output end coupled to the gate of the field effect transistor. An electric potential of the third low voltage level signal input end is higher than an electric potential of the second power supply end.

Optionally, the first transistor is an N-type transistor or a P-type transistor, the second transistor is an N-type transistor or a P-type transistor, and the first power supply end and the second power supply end are the same control signal input end.

Optionally, the driving circuit further comprises a storage capacitor, coupled between the output end and ground.

Advantageous Effect

Embodiments of the present disclosure are directed to a square wave chamfering circuit and a display panel. The square wave chamfering circuit includes a first power supply end, a second power supply end, a driving circuit, and a control circuit. The driving circuit is coupled to the first power supply end, a first node, an output node, a first control signal input end, and a second control signal input end. The driving circuit conducts signal of the first power supply end to the output node in response to a signal of the first control signal input end, and conducts the output node and the first node in response to a signal of the second control signal input end. The control circuit is coupled to the first node and the second power supply end. The control circuit controls the output node to output a chamfering signal based on a current through a path between the control circuit and the second power supply end. By using the control circuit to control an output node to output a chamfering signal based on a current through the control circuit and the second power supply end, a slow decline slope of the voltage output by the output node solves the problem of the large voltage drop of the display panel driving voltage.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

The transistors used in all embodiments of the present disclosure may be thin film transistors, field effect transistors, or other devices with the same characteristics. Since the source and drain of the transistors used herein are symmetrical, the source and drain thereof can be interchanged. In an embodiment of the present disclosure, in order to distinguish the two poles of the transistor other than the gate, one of them is called the source, and the other is called the drain. In addition, the transistors used in the embodiments of the present disclosure may comprise a P-type transistor and/or an N-type transistor, the P-type transistor is turned on when the gate voltage is low and cut off when the gate voltage is high, and the N-type transistor is turned on when the gate voltage is high and cut off when the gate voltage is low.

The present disclosure provides a square wave chamfering circuit and a display panel. It should be noted that the description order of the following embodiments is not intended to limit the preferred order of the embodiments of the present disclosure.

Figure 1:
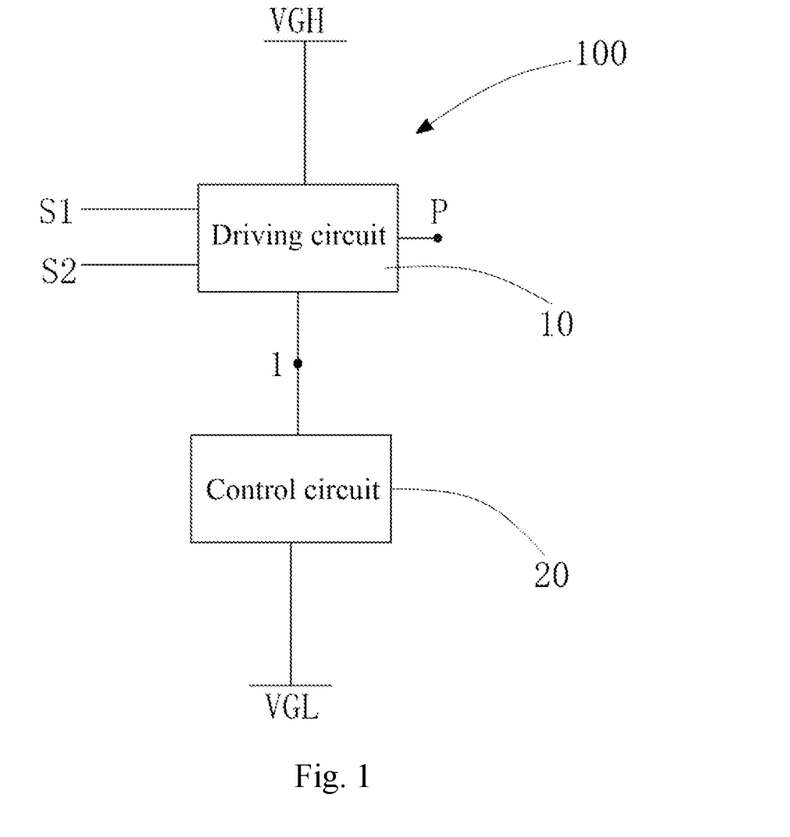
FIG. 1 is a circuit diagram of a square wave chamfering circuit according to a first embodiment of the present disclosure.

Please refer to FIG. 1 illustrating a circuit diagram of a square wave chamfering circuit 100 according to a first embodiment of the present disclosure. The square wave chamfering circuit 100 comprises a first power supply end VGH, a second power supply end VGL, a driving circuit 10, and a control circuit 20.

The driving circuit 10 is coupled to the first power supply end VGH, a first node 1, an output node P, a first control signal input end S1, and a second control signal input end S2. The control circuit 20 is coupled to the first node 1 and the second power supply end VGL. The driving circuit 10 is used to output a signal of the first power supply end VGH to the output node P in response to a signal of the first control signal input end S1. The driving circuit 10 is used to conduct the output node P with the first node 1 in response to a signal of the second control signal input end S2. The control circuit 20 is used to control the output node P to output a chamfering signal based on a current passing through the control circuit 20 and the second power supply end VGL.

The current through the control circuit 20 and the second power supply end VGL is feedback. The control circuit 20 is used to control the output node P to output the chamfering signal based on the current through the control circuit 20 and the second power supply end VGL, so that a voltage output by the output node P has a slow decline slope, solving the problem of the large voltage drop of the display panel driving voltage. In addition, the present disclosure controls the output node P to output the chamfering signal based on the current through the control circuit 20 and the second power supply end VGL. The chamfering of the square wave signal can be realized without additional timing signals.

Figure 2:
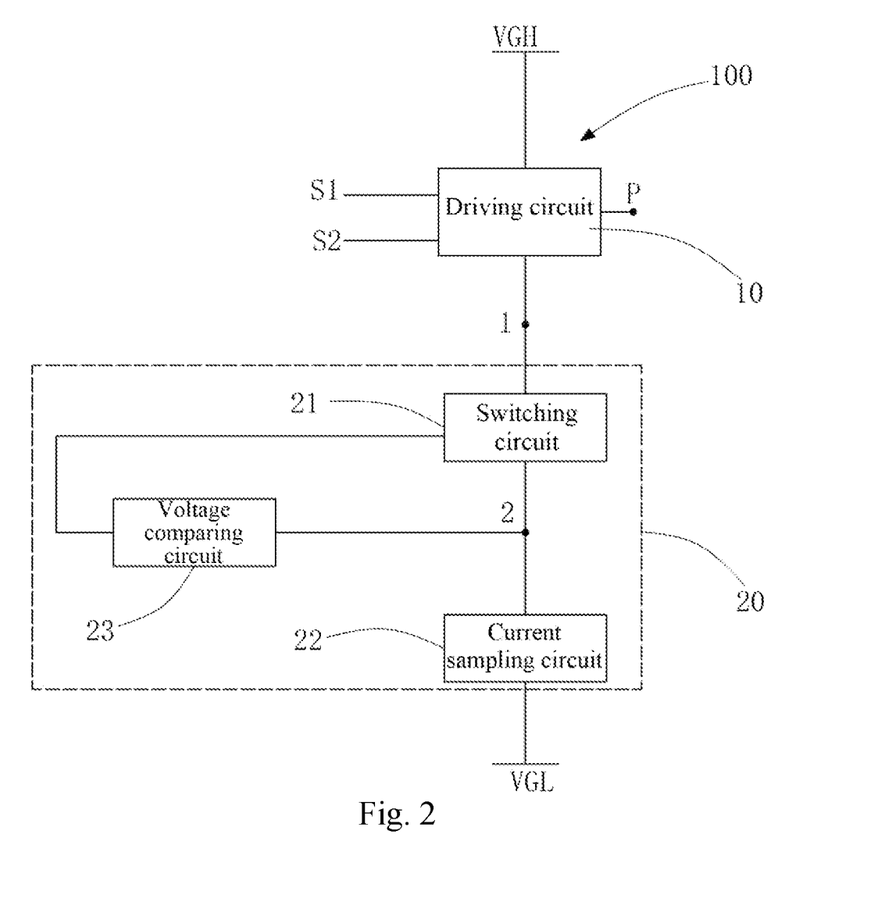
FIG. 2 is a circuit diagram of a square wave chamfering circuit according to a second embodiment of the present disclosure.

Please refer to FIG. 2 illustrating a circuit diagram of the square wave chamfering circuit 100 according to a second embodiment of the present disclosure. In this embodiment, the control circuit 20 comprises a switching circuit 21, a current sampling circuit 22, and a voltage comparing circuit 23.

The switching circuit 21 is coupled between the first node 1 and a second node 2.

The current sampling circuit 22 is coupled between the second node 2 and the second power supply end VGL.

The voltage comparing circuit 23 is coupled to the switching circuit 21 and the second node 2. The voltage comparing circuit 23 is used to control a turned-on state of the switching circuit 21 based on a comparing result provided between a voltage of the second node 2 and a set threshold voltage, so as to control the output node P to output the chamfering signal.

The current provided between the control circuit 20 and the second power supply end VGL is collected by the current sampling circuit 22, and then the sampled voltage signal is led from one end of the current sampling circuit 22 to the voltage comparing circuit 23. The voltage comparing circuit 23 is used to control the turned-on state of the switching circuit 21 based on the comparing result provided between the voltage of the second node 2 and the set threshold voltage. Specifically, when the voltage of the second node 2 is less than the set threshold voltage, the switching circuit 21 is in a fully turned-on state. When the voltage of the second node 2 is greater than the set threshold voltage, the switching circuit 21 is in a non-fully turned-on state, so as to control the output node P to output the chamfering signal.

Figure 3:
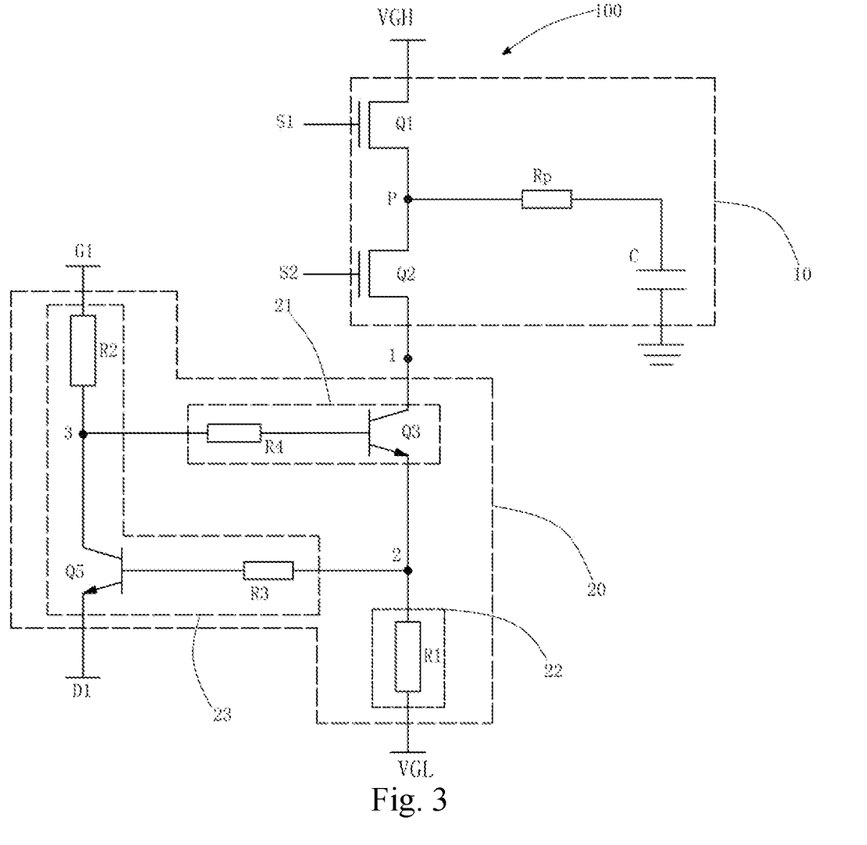
FIG. 3 is a circuit diagram of the square wave chamfering circuit according to a third embodiment of the present disclosure.

Please refer to FIG. 3, which is a third circuit diagram of the square wave chamfering circuit 100 according to one embodiment of the present disclosure. The driving circuit 10 comprises a first transistor Q1 and a second transistor Q2. The gate of the first transistor Q1 is coupled to the first control signal input end S1, the source of the first transistor Q1 is coupled to the first power supply end VGH, and the drain of the first transistor Q1 is coupled to the output node P. The gate of the second transistor Q2 is coupled to the second control signal input end S2, the drain of the second transistor Q2 is coupled to the output node P, and the source of the second transistor Q2 is coupled to the first node 1.

The first transistor Q1 is controlled by the first control signal input end S1, and the second transistor Q2 is controlled by the second control signal input end S2. The first transistor Q1 and the second transistor Q2 are independently controlled by different control signals.

In addition, the driving circuit 10 further comprises a storage capacitor C. Both ends of the storage capacitor C are coupled to the output node P and the ground. The storage capacitor C storing the voltage of the output node 1 can stabilize the gate voltage of the transistor of the sub-pixel of the display panel, while keeping the driving voltage of the display panel from sudden change, so as to ensure the display effect of the display panel.

The driving circuit 10 comprises an adjusting resistor Rp, which is coupled between the storage capacitor C and the output node P. The charging and discharging current of the storage capacitor C can be reduced by the adjusting resistor Rp.

The current sampling circuit 22 comprises a first resistor R1 which is coupled between the second node 2 and the second power supply end VGL.

The switching circuit 21 comprises a switch tube, which comprises a control end, a first electrode, and a second electrode, and the first electrode and the second electrode of the switch tube are coupled between the first node 1 and the second node 2. The current sampling circuit 22 is coupled between the second node 2 and the second power supply end VGL. The voltage comparing circuit 23 is respectively coupled to the second node 2 and the control end of the switch tube. Specifically, the first electrode and the second electrode of the switch tube are coupled between the source of the second transistor Q2 and the second node 2.

The switching circuit 21 comprises a first bipolar junction transistor Q3. The base of the first bipolar junction transistor Q3 is coupled to the voltage comparing circuit 23, and the emitter of the first bipolar junction transistor Q3 is coupled to the first node 1. Specifically, the emitter of the first bipolar junction transistor Q3 is coupled to the source of the second transistor Q2. The collector of the first bipolar junction transistor Q3 is coupled to the second node 2. At this time, the voltage comparing circuit 23 is used to control a turned-on state of the first bipolar junction transistor Q3 based on the comparing result provided between the voltage of the second node 2 and the set threshold voltage. Specifically, when the voltage of the second node 2 is less than the set threshold voltage, the first bipolar junction transistor Q3 is in a fully turned-on state. When the voltage of the second node 2 is greater than the set threshold voltage, the first bipolar junction transistor Q3 is in a non-fully turned-on state. Thus, the output node P is controlled to output the chamfering signal.

Under the control of the first control signal input end S1 and the second control signal input end S2, the first transistor Q1 is turned on, and the second transistor Q2 turned off. At this time, the first transistor Q1 outputs the signal of the first power supply end VGH to the output node P, and the first power supply end VGH is at a high voltage level. Since the second transistor Q2 is turned off, the current provided between the first bipolar junction transistor Q3 and the second power supply end VGL is zero, that is, the voltage of the second node 2 is zero, the voltage of the second node 2 is less than the set threshold voltage, and the voltage comparing circuit 23 makes the first bipolar junction transistor Q3 in a fully turned-on state. Under the control of the first control signal input end S1 and the second control signal input end S2, the first transistor Q1 is turned off, and the second transistor Q2 is turned on. At this time, under the voltage of the output node P, a current is generated between the first bipolar junction transistor Q3 and the second power supply end VGL, and the voltage of the second node 2 is greater than the set threshold voltage. The voltage comparing circuit 23 makes the first bipolar junction transistor Q3 in a non-fully turned-on state, thereby controlling the output node P to output the chamfering signal.

The voltage comparing circuit 23 comprises a second bipolar junction transistor Q5 and a second resistor R2. The base of the second bipolar junction transistor Q5 is coupled to the second node 2, the emitter of the second bipolar junction transistor Q5 is coupled to a third node 3, and the collector of the second bipolar junction transistor Q5 is coupled to a first low voltage level signal input end D1. The second resistor R2 is coupled between the third node 3 and a first high voltage level signal input end G1. The third node 3 is coupled to the base of the first bipolar junction transistor Q3.

When the first transistor Q1 is turned on, the second transistor Q2 is turned off, and the voltage of the second node 2 is less than the cut-off voltage of the second bipolar junction transistor Q5, the second bipolar junction transistor Q5 is turned off, the voltage of the base of the first bipolar junction transistor Q3 is a high-level voltage of the first high voltage level signal input end G1, and the first bipolar junction transistor Q3 is a fully turned-on state. The threshold voltage is the cut-off voltage of the second bipolar junction transistor Q5. When the first transistor Q1 is turned off, the second transistor Q2 is turned on, and the voltage of the second node 2 is greater than the set threshold voltage, the second bipolar junction transistor Q5 is turned on, and the voltage of the third node 3 is pulled down. At this time, the first bipolar junction transistor Q3 is in a non-fully turned-on state, so as to control the output node P to output the chamfering signal.

The voltage comparing circuit 23 further comprises a third resistor R3 coupled between the base of the second bipolar junction transistor Q5 and the second node 2. The switching circuit 21 further comprises a fourth resistor R4 coupled between the third node 3 and the base of the first bipolar junction transistor Q3.

Figure 4:
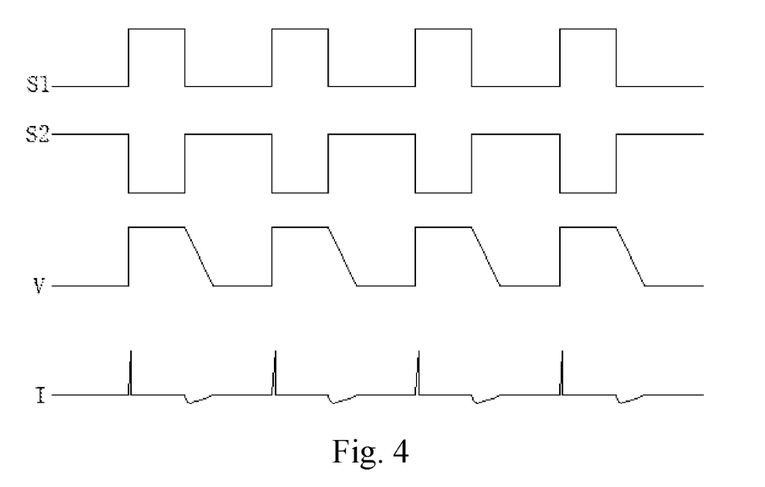
FIG. 4 illustrates a timing diagram of voltage and current of an output node and a control signal of the square wave chamfering circuit according to one embodiment of the present disclosure.

Please refer to FIG. 4 illustrating a timing diagram of voltage and current of an output node and a control signal of the square wave chamfering circuit according to one embodiment of the present disclosure. The first control signal input end S1 is at a high voltage level, while the second control signal input end S2 is at a low voltage level. At this time, the first transistor Q1 outputs the high voltage level signal of the first power supply end VGH to the output node P under the control of the first control signal input end S1, and the voltage of the output node P is at a high voltage level. At this time, the current of the output node P first rapidly rises to the maximum value from zero and then drops to zero. The first control signal input end S1 is at a low voltage level, while the second control signal input end S2 is at a high voltage level. At this time, the first transistor Q1 is turned off, and the output node P is in a discharge state. The current of the output node P first reaches the limited current value from zero, and then the current of the output node P is reduced from the limited current value to zero. The limited current value is much smaller than the maximum value. Therefore, the present disclosure can control the discharge current of the output node P, so that the voltage of the output node P decreases slowly, and solve the problem of the large voltage drop of the display panel driving voltage.

In addition, the limited current value depends on the voltage of the second node 2 and the set threshold voltage set by the voltage comparing circuit 23. By adjusting the resistor of the current sampling circuit 22 and the set threshold voltage, the limited current value can be adjusted as well as the falling slope of the voltage applied on the output node P.

The embodiment of the present disclosure is also directed to a display panel, which comprises a gate driving circuit. The gate driving circuit comprises a plurality of shift registers cascaded. A driving signal output ends of each of the shift registers is coupled to one of gate lines. The display panel further comprises the square wave chamfering circuit 100 which is corresponding to each of the shift registers. The first power supply end VGH of the square wave chamfering circuit 100 is coupled to the driving signal output end of the shift register, and the output node P of the square wave chamfering circuit 100 is coupled to the gate line.

The driving signal output end of each of the shift registers is coupled to the corresponding gate line through the corresponding square wave chamfering circuit 100. The principle of the display panel to solve the problem is similar to the square wave chamfering circuit 100. Therefore, the implementation and beneficial effects of the display panel can refer to the description of the square wave chamfering circuit 100, and the repetition will not be repeated here.

Figure 5:
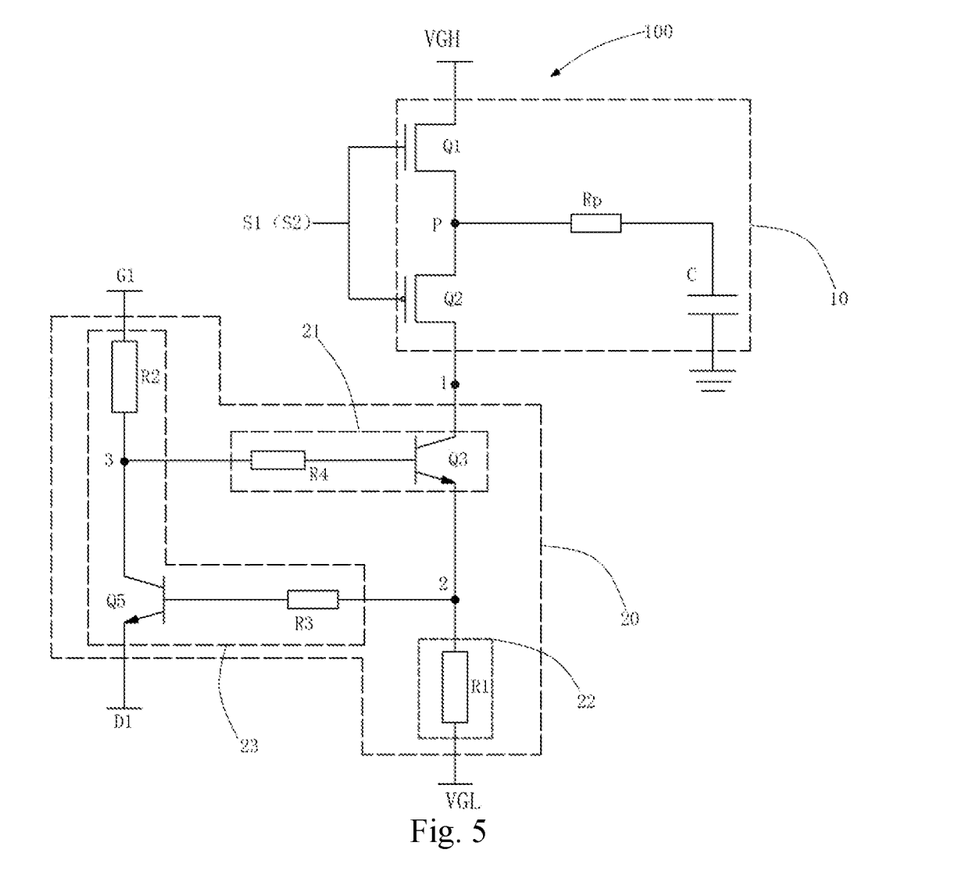
FIG. 5 illustrates a circuit diagram of the square wave chamfering circuit according to a fourth embodiment of the present disclosure.

Please refer to FIG. 5 illustrating a circuit diagram of the square wave chamfering circuit 100 according to a fourth embodiment of the present disclosure. The difference between the structure of this embodiment and the square wave chamfering circuit 100 provided in FIG. 3 is that the first transistor Q1 is an N-type transistor, the second transistor Q2 is a P-type transistor, and the first control signal input end S1 and the second control signal input end S2 are the same control signal input end. That is to say, in this embodiment, the first transistor Q1 and the second transistor Q2 adopt the same control signal. When the control signal is at a high voltage level, the first transistor Q1 is turned on and outputs the signal of the first power supply end VGH to the output node P. The storage capacitor C stores the voltage of the output node P. At this time, the second transistor Q2 is turned off. When the control signal is at a low voltage level, the first transistor Q1 is turned off, and the second transistor Q2 is turned on and discharges the output node P. It can be seen from that the first transistor Q1 and the second transistor Q2 use the same control signal mentioned above. On one hand, the setting of the signal line can be reduced. On the other hand, only one of the first transistor Q1 and the second transistor Q2 can be turned on at a time, so as to avoid the situation that the first transistor Q1 and the second transistor Q2 are turned on or off at the same time.

Figure 6:
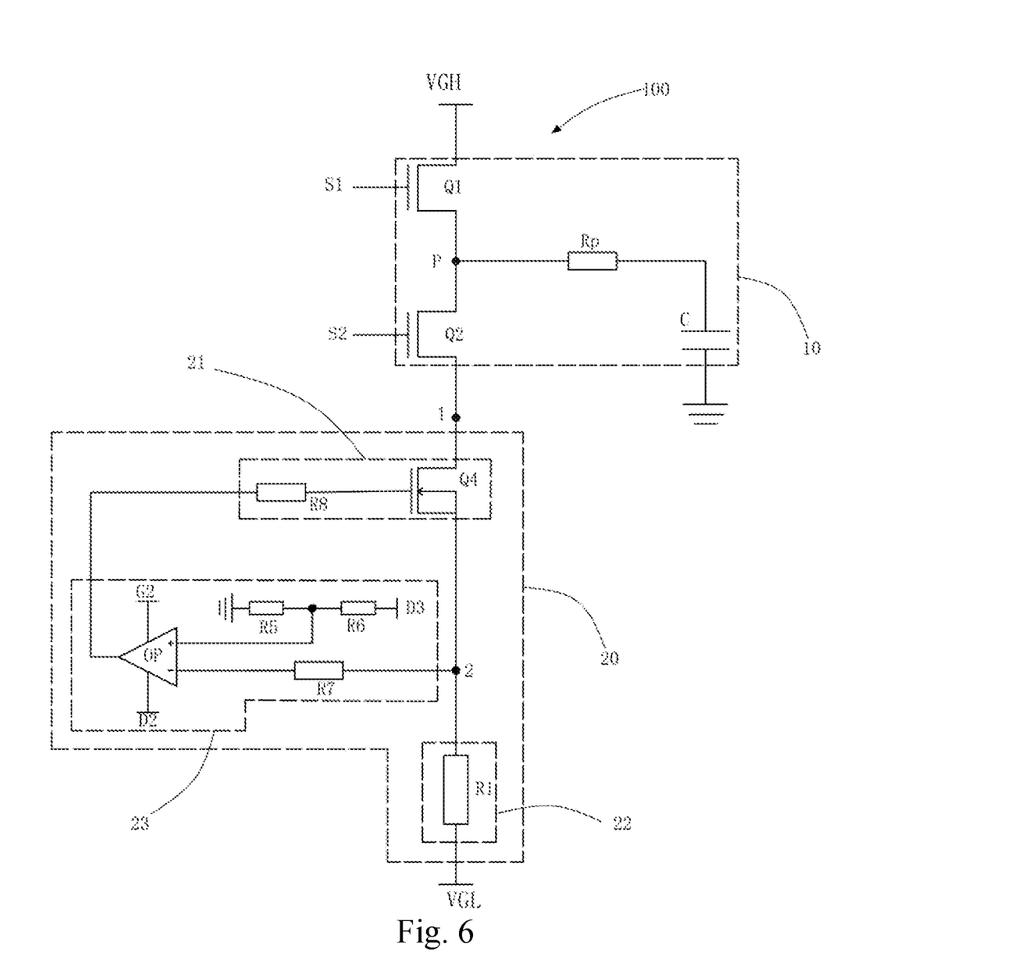
FIG. 6 illustrates a circuit diagram of the square wave chamfering circuit according to a fifth embodiment of the present disclosure.

Please refer to FIG. 6 illustrating a circuit diagram of the square wave chamfering circuit 100 according to a fifth embodiment of the present disclosure. The difference between the structure of this embodiment and the square wave chamfering circuit 100 provided in FIG. 3 is that the switching circuit 21 comprises a field effect transistor Q4, the gate of the field effect transistor Q4 is coupled to the voltage comparing circuit 23, and the drain of the field effect transistor Q4 is coupled to the first node 1. Specifically, the drain of the field effect transistor Q4 is coupled to the source of the second transistor Q2, and the source of the field effect transistor Q4 is coupled to the second node 2.

At this time, the voltage comparing circuit 23 is used to control the turned-on state of the field effect transistor Q4 based on the comparison result between the voltage of the second node 2 and the set threshold voltage. Specifically, when the voltage of the second node 2 is less than the set threshold voltage, the field effect transistor Q4 is in a fully turned-on state. When the voltage of the second node 2 is greater than the set threshold voltage, the field effect transistor Q4 is in a non-fully turned-on state, thereby controlling the output node P to output the chamfering signal.

Under the control of the first control signal input end S1 and the second control signal input end S2, the first transistor Q1 is turned on, and the second transistor Q2 is turned off. At this time, the first transistor Q1 outputs the signal of the first power supply end VGH to the output node P. The first power supply end VGH is at a high voltage level. Since the second transistor Q2 is turned off, the current provided between the field effect transistor Q4 and the second power supply end VGL is zero, that is, the voltage of the second node 2 is zero, the voltage of the second node 2 is less than the set threshold voltage, and the voltage comparing circuit 23 makes the field effect transistor Q4 in a fully turned-on state. Under the control of the first control signal input end S1 and the second control signal input end S2, the first transistor Q1 is turned off and the second transistor Q2 is turned on. At this time, under the voltage of the output node P, a current is induced between the field effect transistor Q4 and the second power supply end VGL. The voltage of the second node 2 is greater than the set threshold voltage. The voltage comparing circuit 23 makes the field effect transistor Q4 in a non-fully turned-on state, thereby controlling the output node P to output the chamfering signal.

In some embodiments, the voltage comparing circuit 23 comprises a voltage comparator OP. A positive power supply end of the voltage comparator OP is coupled to a second high voltage level signal input end G2. A negative power supply end of the voltage comparator OP is coupled to the second low voltage level signal input end D2. A positive phase input end of the voltage comparator OP is coupled to a third low voltage level signal input end D3. A negative phase input end of the voltage comparator OP is coupled to the second node 2. An output end of the voltage comparator OP is coupled to the gate of the field effect transistor Q4. An electric potential of the third low voltage level signal input end D3 is higher than an electric potential of the second power supply end VGL.

When the first transistor Q1 is turned on, and the second transistor Q2 is turned off, the voltage of the second node 2 is the electric potential of the second power supply end VGL, the voltage of the third low voltage level signal input end D3 is the set threshold voltage, and the voltage of the negative phase input end of the voltage comparator OP is less than the voltage of the positive phase input end of the voltage comparator OP. The output end of the voltage comparator OP outputs the high-level voltage of the second high voltage level signal input end G2. The voltage comparator OP makes the field effect transistor Q4 in a fully turned-on state. When the first transistor Q1 is turned off, the second transistor Q2 is turned on, the voltage of the second node 2 is greater than the voltage of the third low voltage level signal input end D3, and the output end of the voltage comparator OP outputs the low-level voltage of the second low voltage level signal input end D2. At this time, the field effect transistor Q4 is in a non-fully turned-on state, so as to control the output node P to output the chamfering signal.

Further, the voltage comparing circuit 23 further comprises a fifth resistor R5, a sixth resistor R6, and a seventh resistor R7. One end of the fifth resistor R5 is grounded, the other end of the fifth resistor R5 is coupled to one end of the sixth resistor R6. The other end of the sixth resistor R6 is coupled to the third low voltage level signal input end D3. The positive phase input end of the voltage comparator OP is coupled to the other end of the fifth resistor R5. The seventh resistor R7 is coupled between the negative phase input end of the voltage comparator OP and the second node 2. The current through the positive phase input end of the voltage comparator OP can be prevented from being too large by setting the fifth resistor R5 and the sixth resistor R6. The current through the negative phase input end of the voltage comparator OP can be prevented from being too large by setting the seventh resistor R7.

The switching circuit 21 further comprises an eighth resistor R8 coupled between the output end of the voltage comparator OP and the gate of the field effect transistor Q4. The current at the output end of the voltage comparator OP can be prevented from being too large by setting the eighth resistor R8.

A square wave chamfering circuit and a display panel provided by the embodiments of the present disclosure have been described in detail above. Specific examples are used herein to illustrate the principles and implementations of the present disclosure, and the descriptions of the above embodiments are only used to help understand the methods and core ideas of the present disclosure. Meanwhile, for those skilled in the art, according to the idea of the present disclosure, there will be changes in the specific embodiments and application scope. In conclusion, the content of this specification should not be construed as a limitation on the present disclosure.

What is claimed is:

1. A square wave chamfering circuit, comprising:
   a first power supply end;
   a second power supply end;
   a driving circuit, coupled to the first power supply end, a first node, an output node, a first control signal input end, and a second control signal input end, for conducting a signal of the first power supply end to the output node in response to a signal of the first control signal input end, and for conducting the output node and the first node in response to a signal of the second control signal input end; and
   a control circuit, coupled to the first node and the second power supply end, for controlling the output node to output a chamfering signal based on a current through a path between the control circuit and the second power supply end,
   wherein the control circuit comprises:
   a switching circuit, coupled between the first node and a second node;
   a current sampling circuit, coupled between the second node and the second power supply end; and
   a voltage comparing circuit, coupled to the switching circuit and the second node, for controlling a turned-on state of the switching circuit based on a comparing result between a voltage of the second node and a set threshold voltage, to control the output node to output the chamfering signal.

2. The square wave chamfering circuit as claimed in claim 1, wherein the driving circuit comprises:
a first transistor, comprising a gate coupled to the first control signal input end, a source coupled to the first power supply end, and a drain coupled to the output node; and
a second transistor, comprising a gate coupled to the second control signal input end, a drain coupled to the output node, and a source coupled to the first node.

3. The square wave chamfering circuit as claimed in claim 2,
wherein the first transistor is a N-type transistor or a P-type transistor, the second transistor is a N-type transistor or a P-type transistor, and the first power supply end and the second power supply end are the same control signal input end.

4. The square wave chamfering circuit as claimed in claim 1, wherein the current sampling circuit comprises a first resistor coupled between the second node and the second power supply end.

5. The square wave chamfering circuit as claimed in claim 1, wherein the switching circuit comprises:
a first bipolar junction transistor, comprising a base coupled to the voltage comparing circuit, an emitter coupled to the first node, and a collector coupled to the second node.

6. The square wave chamfering circuit as claimed in claim 5, wherein the voltage comparing circuit comprises:
a second bipolar junction transistor, comprising a base coupled to the second node, an emitter coupled to a third node, and a collector coupled to a first low voltage level signal input end; and
a second resistor, coupled to the third node and the first high voltage level signal input end.

7. The square wave chamfering circuit as claimed in claim 1, wherein the switching circuit comprises:
a field effect transistor, comprising a gate coupled to the voltage comparing circuit, a drain coupled to the first node, and a source coupled to the second node.

8. The square wave chamfering circuit as claimed in claim 7, wherein the voltage comparing circuit comprises:
a voltage comparator, comprising a positive power supply end coupled to a second high voltage level signal input end, a negative power supply end coupled to a second low voltage level signal input end, a positive phase input end coupled to a third low voltage level signal input end, a negative phase input end coupled to the second node, and an output end coupled to the gate of the field effect transistor,
where an electric potential of the third low voltage level signal input end is higher than an electric potential of the second power supply end.

9. The square wave chamfering circuit as claimed in claim 1, wherein the driving circuit further comprises:
a storage capacitor, coupled between the output end and ground.

10. A display panel, comprising:
a gate driving circuit, comprising a plurality of shift registers cascaded, and a driving signal output end of each of the shift registers being coupled to one of a plurality of gate lines;
a square wave chamfering circuit, comprising:
a first power supply end, coupled to the driving signal output end of the shift register;
an output node, coupled to the gate line;
a second power supply end;
a driving circuit, coupled to the first power supply end, a first node, the output node, a first control signal input end, and a second control signal input end, for conducting a signal of the first power supply end to the output node in response to a signal of the first control signal input end, and for conducting the output node and the first node in response to a signal of the second control signal input end; and
a control circuit, coupled to the first node and the second power supply end, for controlling the output node to output a chamfering signal based on a current through a path between the control circuit and the second power supply end,
wherein the control circuit comprises:
a switching circuit, coupled between the first node and a second node;
a current sampling circuit, coupled between the second node and the second power supply end; and
a voltage comparing circuit, coupled to the switching circuit and the second node, for controlling a turned-on state of the switching circuit based on a comparing result between a voltage of the second node and a set threshold voltage, to control the output node to output the chamfering signal.

11. The display panel as claimed in claim 10, wherein the driving circuit comprises:
a first transistor, comprising a gate coupled to the first control signal input end, a source coupled to the first power supply end, and a drain coupled to the output node; and
a second transistor, comprising a gate coupled to the second control signal input end, a drain coupled to the output node, and a source coupled to the first node.

12. The display panel as claimed in claim 11, wherein the first transistor is a N-type transistor or a P-type transistor, the second transistor is a N-type transistor or a P-type transistor, and the first power supply end and the second power supply end are the same control signal input end.

13. The display panel as claimed in claim 10, wherein the current sampling circuit comprises a first resistor coupled between the second node and the second power supply end.

14. The display panel as claimed in claim 10, wherein the switching circuit comprises:
a first bipolar junction transistor, comprising a base coupled to the voltage comparing circuit, an emitter coupled to the first node, and a collector coupled to the second node.

15. The display panel as claimed in claim 14, wherein the voltage comparing circuit comprises:
a second bipolar junction transistor, comprising a base coupled to the second node, an emitter coupled to a third node, and a collector coupled to a first low voltage level signal input end; and
a second resistor, coupled to the third node and the first high voltage level signal input end.

16. The display panel as claimed in claim 10, wherein the switching circuit comprises:
a field effect transistor, comprising a gate coupled to the voltage comparing circuit, a drain coupled to the first node, and a source coupled to the second node.

17. The display panel as claimed in claim 16, wherein the voltage comparing circuit comprises:
a voltage comparator, comprising a positive power supply end coupled to a second high voltage level signal input end, a negative power supply end coupled to a second low voltage level signal input end, a positive phase input end coupled to a third low voltage level signal input end, a negative phase input end coupled to the second node, and an output end coupled to the gate of the field effect transistor, where an electric potential of the third low voltage level signal input end is higher than an electric potential of the second power supply end.

18. The display panel as claimed in claim 10, wherein the driving circuit further comprises:

a storage capacitor, coupled between the output end and ground.

\* \* \* \* \*